July 30, 1957  E. W. JACOBSON ET AL  2,800,972
DRIVE CHAIN ADJUSTER FOR AMPHIBIOUS VEHICLES
Filed Aug. 20, 1953  5 Sheets-Sheet 1

INVENTORS
E. W. JACOBSON
B. M. WEDNER

BY
Horace B. Cooke
their ATTORNEY

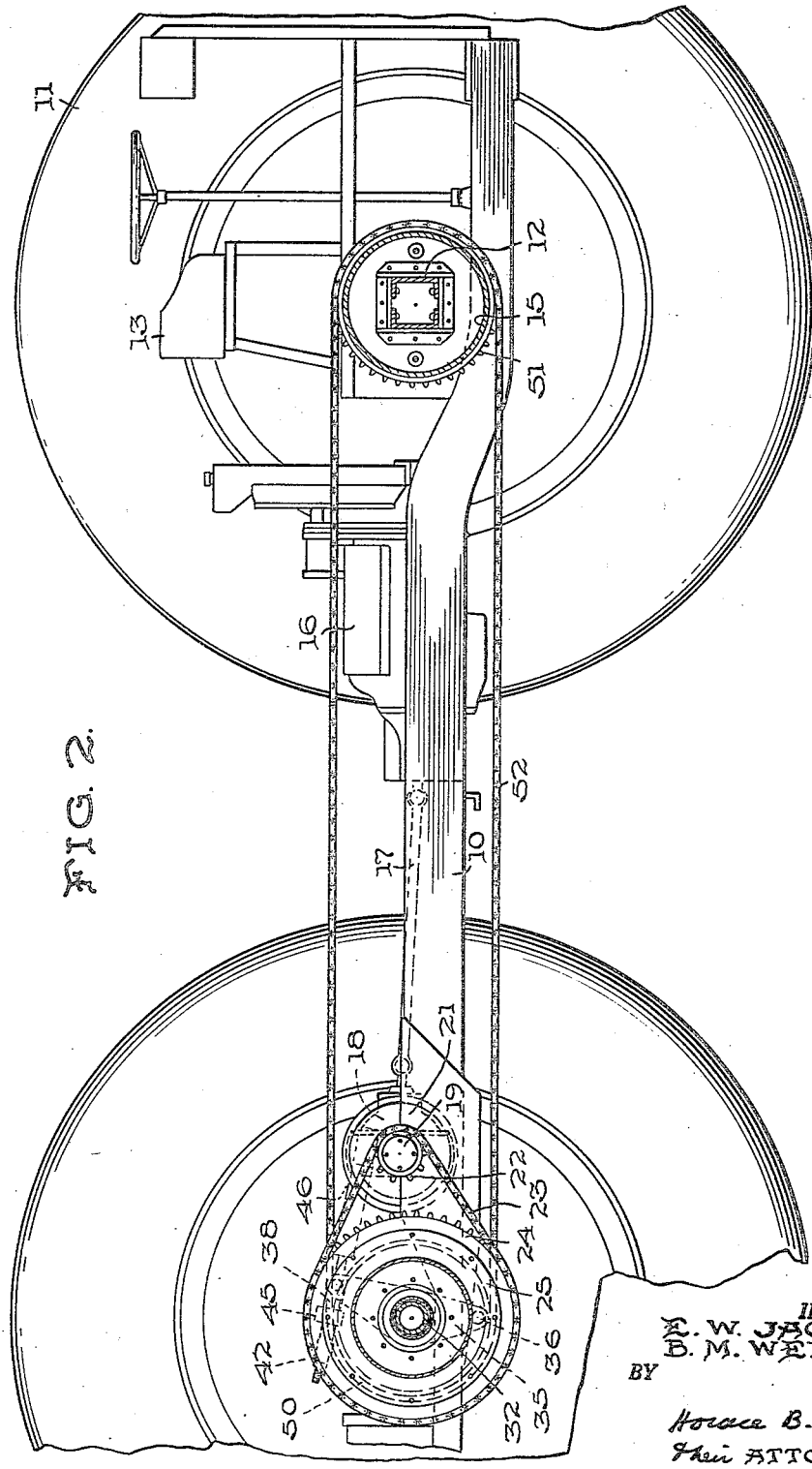

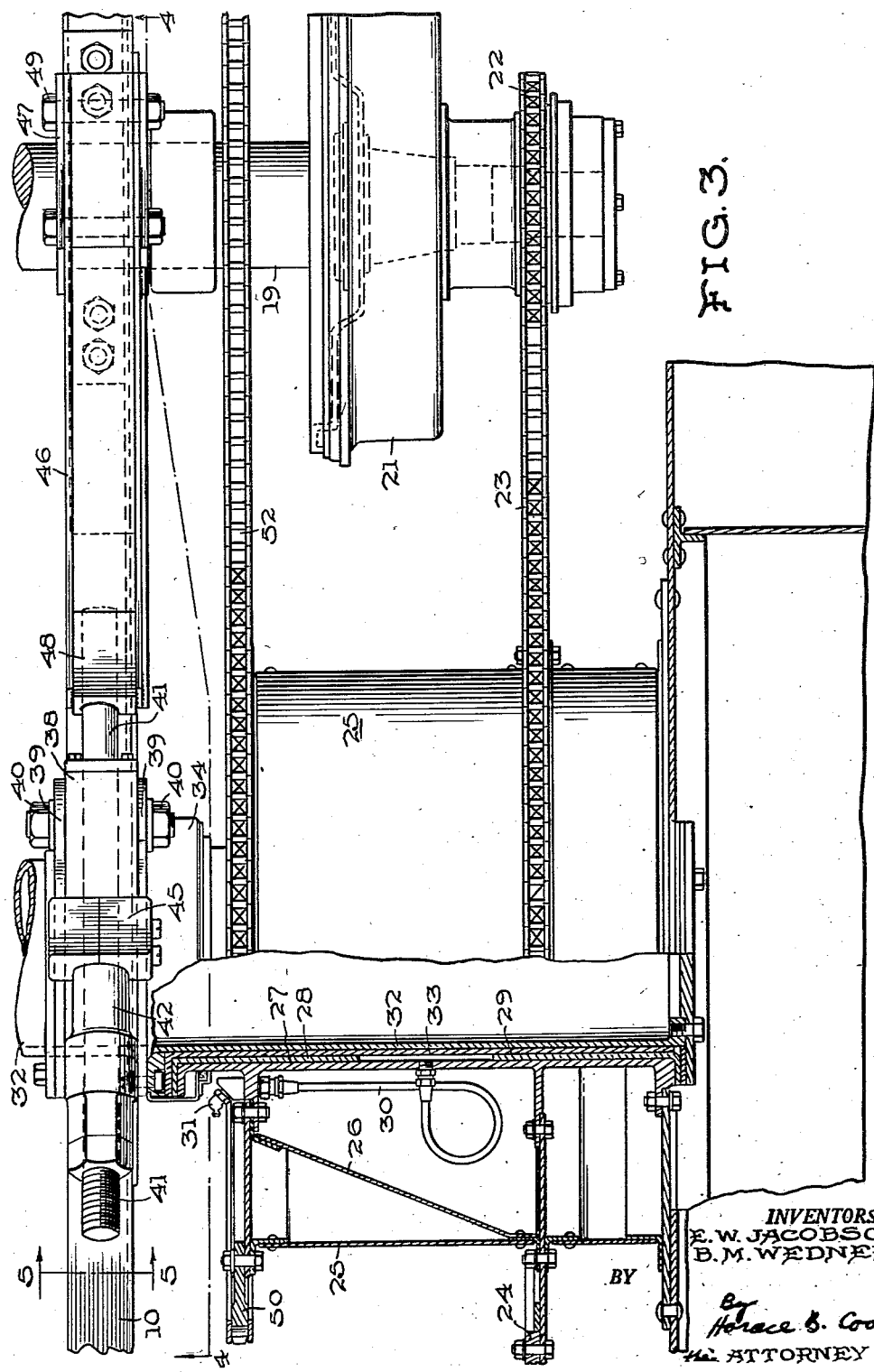

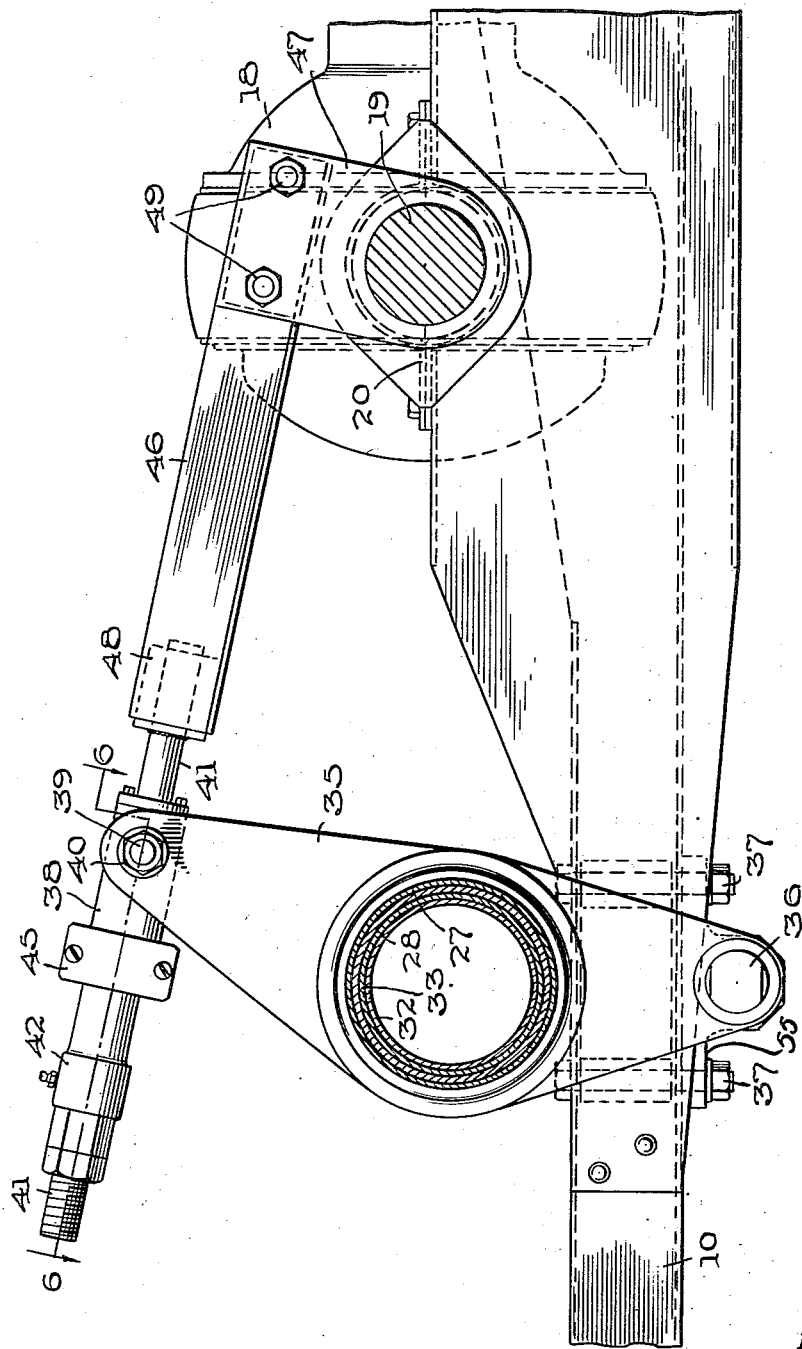

July 30, 1957 E. W. JACOBSON ET AL 2,800,972
DRIVE CHAIN ADJUSTER FOR AMPHIBIOUS VEHICLES
Filed Aug. 20, 1953 5 Sheets-Sheet 5
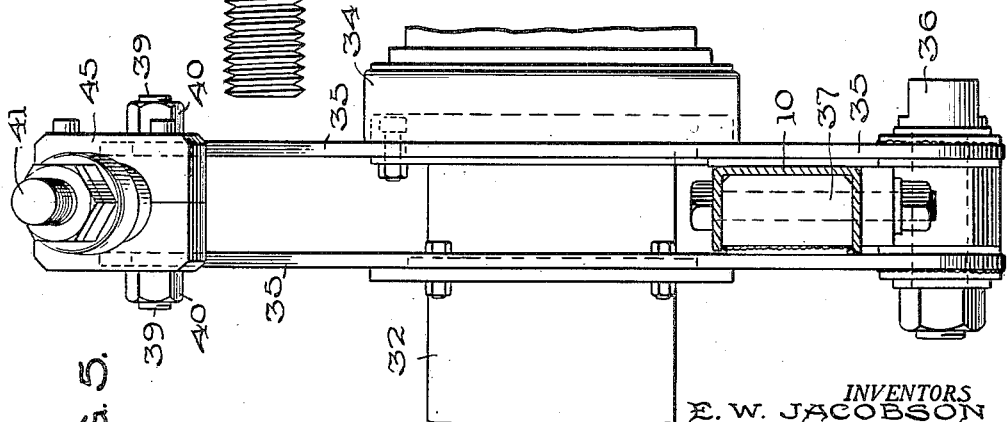
INVENTORS
E. W. JACOBSON
B. M. WEDNER
BY
Horace B. Cooke
Their ATTORNEY

United States Patent Office 2,800,972
Patented July 30, 1957

2,800,972

DRIVE CHAIN ADJUSTER FOR AMPHIBIOUS VEHICLES

Eugene W. Jacobson, Oakmont, and Benjamin M. Wedner, Pittsburgh, Pa., assignors to Gulf Research & Development Company, Pittsburgh, Pa., a corporation of Delaware Application August 20, 1953, Serial No. 375,539

1 Claim. (Cl. 180—72)

This invention relates to a drive chain adjuster for amphibious vehicles of the type having large pneumatic-tired wheels for propulsion on land and water. More particularly, the invention comprises an adjuster which may be manipulated from the operator's platform of the vehicle for varying the wheel base by bodily moving a dead axle on which one pair of traction wheels is mounted and thereby tightening or loosening a roller chain through which the driving power of the engine is transmitted to the wheels without requiring the operator to dismount for making adjustments, such adjuster including a torque arm which transmits the reaction of the driving force to the vehicle frame, thereby performing a dual function and, by eliminating the need for an extra torque arm, lightening the drive for the vehicle.

Terrain over which this sort of vehicle is designed to travel in exploratory operations such as geophysical prospecting in soft and treacherous, including swamps, marshes and stretches of open water, none of which affords a footing for persons or support for ordinary land vehicles. Typical of such country is the vast uncharted swamp land of the Mississippi Delta, comprising many thousands of square miles of floating prairie, open water, and practically bottomless mud.

Prior to the invention of the marsh buggy (Patent No. 2,187,658) country of this nature was virtually impenetrable. Land vehicles could not operate there, and on the scattered bodies of open water and tortuous connecting waterways transportation by boat was not only slow and hazardous but in many cases was impossible because of dense growths of floating vegetation. The marsh buggy has overcome these formidable obstacles since it offers a stable, buoyant platform that is excellently adapted for transportation of men and equipment over treacherous country such as this. There is, however, the consideration that the operating personnel be enabled to make necessary adjustments to the vehicle from time to time with minimum inconvenience or risk to their personal safety. To this end the present invention provides an easily accessible means for adjusting the driving chains from the platform of the vehicle without requiring the operator to dismount and which also may be manipulated to loosen the chains in the event of engine breakdown or other mechanical failure imposing a drag on the wheels, so that the chains may be disengaged from the driving sprocket gears to allow the wheels to turn freely, permitting the vehicle to be readily winched or towed to a convenient place for repair.

In the accompanying drawings wherein the invention is shown applied to a vehicle of the aforementioned type:

Figure 2 is a side view taken partly in section along the line 2—2 of Figure 1.

Figure 3 is an enlarged detail view, in plan, showing the drive arrangement and the location of the chain adjuster with respect thereto.

Figure 4 is a side view of the adjuster.

Figure 5 is a view taken longitudinally of the vehicle from the vertical plane indicated by line 5—5 of Figure 3.

Figure 6 is a longitudinal view taken along the line 6—6 of Figure 4.

Figure 7 is a transverse view taken along the line 7—7 of Figure 6.

Figure 1:
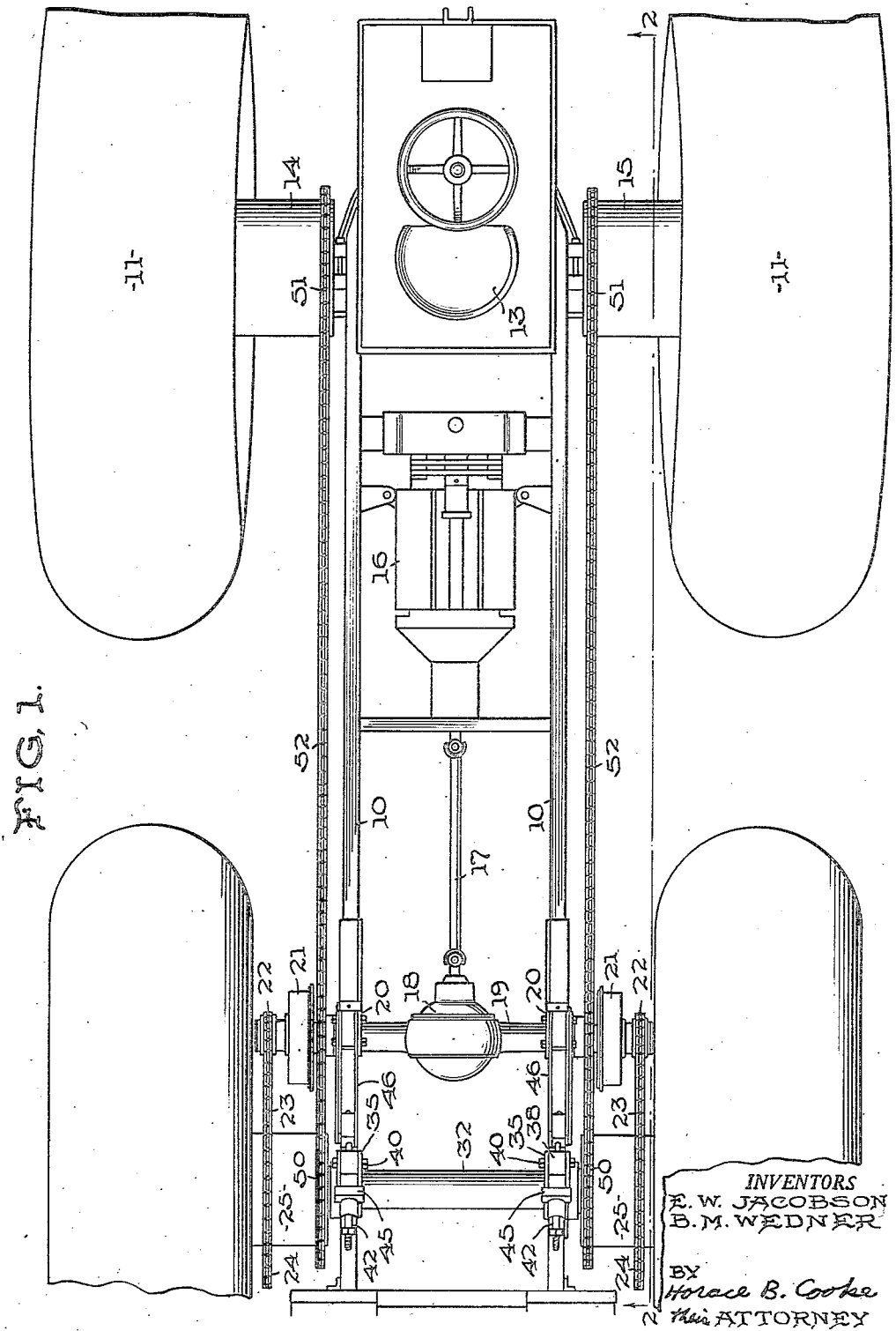
Figure 1 is a plan view of the vehicle minus the platform which ordinarily extends rearwardly from the driver's seat.

Referring more particularly to the drawings, the vehicle comprises a frame 10, the side rails of which are channel-shaped and preferably made of a light weight alloy. Large, buoyant front wheels 11 are mounted on a dead axle 12 which is carried by the frame approximately under the driver's seat 13. The mechanism for steering the vehicle is described in detail in the aforesaid Patent No. 2,187,658 and by reference to that disclosure it will be understood that the drums 14 and 15 which transmit driving power to the front wheels do not change position as the front wheels are turned in steering the vehicle.

An engine 16, which is bedded between the longitudinal members of the frame, drives a propeller shaft 17 through universal joints in a conventional manner and the driving torque is transmitted to a differential shown generally at 18 and thence to a drive shaft which with its housing is generally indicated at 19 and which lies transversely of the frame. Power is thus transmitted to the drive shaft which with its housing is secured to the frame by clamps 20, the shaft 19 and housing extending beyond the sides of the frame and having brakes 21 mounted thereon. Outwardly beyond the brakes the shaft 19 carries sprocket gears 22 at either end, which sprockets are connected by roller chains 23 to larger sprocket gears 24 through which the rear wheels are driven.

As shown more particularly in Figure 3, the sprocket gear 24 on each side of the vehicle is fastened to a drum 25 which is compartmented and braced internally by a cone 26, the drum having a continuous, inner axial wall 27 to which bearing sleeves 28 and 29 are fitted, the ends of the bearing sleeves being spaced to facilitate the application of lubricant through pipe 30 from fitting 31.

The drums 25 are mounted on a tubular dead axle 32 to which a bearing sleeve 33 is fitted so that the bearing sleeves 28 and 29 within the drum rotate in contact therewith when the vehicle is in motion, and lubricant supplied through the fitting 31 may work its way between the contacting bearing surfaces. A dust cap 34 encloses an outturned flange formed as a continuation of the inner wall of the drum, as well as the nesting outturned ends of the bearing sleeves 28 and 33.

The dead axle 32 passes through bell cranks 35, which are formed as yoke arms, in that each of them comprises a pair of similarly formed plates pivotally connected by a pin 36 to a clamping bracket 55 which embraces the frame of the vehicle to which it is secured by bolts 37, as shown in Figure 4. The pivot pin 36 is offset from the axle 32 in vertical direction, the distance between them constituting one arm of the bell crank, so that as the bell crank 35 is moved about the pivot, the axle will swing forwardly or rearwardly in a slightly arcuate path.

The upper arms of bell crank or yoke 35 receive between them a tubular or other hollow member 38, which has laterally projecting gudgeons 39 for pivotal connection of these parts. Nuts 40 on the threaded ends of these gudgeons secure the parts in assembled relation.

A rod 41 which has a sliding fit in the tubular member 38 has a threaded end which passes through and is engaged by an internally threaded tubular adjuster sleeve 42 which is aligned with the tubular member 38. The abutting ends of the member 38 and adjuster sleeve 42 are formed with circumferential flange portions 43 and 44 engaged by an encircling clamp 45 to hold these parts together yet permit the adjuster sleeve 42 to rotate and thus advance the connected tubular element 38 and bell crank 35 with respect to the rod 41. As shown in Figure 7, the encircling clamp 45 is formed of two complementary sections which are fastened together by screws or other suitable means.

The rod 41 at its opposite end is welded or otherwise permanently secured to a connecting link 46, the two together comprising a torque arm which is attached to a bracket 47 secured to the housing of drive shaft 19, as by bolts 49, so that the bell crank takes the reaction of the driving force of the transverse drive shaft and transmits this force to the vehicle frame. By utilizing the chain adjuster as a torque carrying device, the weight of an extra torque arm has been eliminated and in this way the drive for the vehicle lightened. The bracket 47 may instead be fastened directly to the frame or anchored in other ways which will permit the torque arm to have limited oscillation in a vertical plane as bell crank 35 swings about its pivot 36. The link 46 may conveniently be of channel-shape, confining a block 48 welded thereto and formed with a bore within which the rod 41 is welded so that the rod and link form a unitary tension member.

The drums 25 which are mounted on the dead axle 32 carry sprocket gears 50 which connect with the sprocket gears 51 on the front wheel drums through roller chains 52. Thus, the driving torque of the engine is transmitted successively through sprockets 22, 24, drums 25 and sprockets 50, to the sprockets 51 on the front wheel drums, causing all four wheels to rotate. Close adjustment of the short drive chain is important. Since the sprocket on the drive shaft is small, there are only a few teeth in contact with the chain; thus there should be a minimum of slack in the chain, for with excessive slack there is a tendency for the chain to ride off of the teeth. This condition is caused by the small angle of contact which results when a small sprocket and a relatively large one operate at close centers.

If slack develops in the drive chain the operator need only to reach over the side of the platform and turn the adjuster sleeve with a wrench to move the rear axle and thus tighten the chain by increasing the distance between the movable axle and drive shaft. Conversely, should it be desired to remove the chain for replacement or to free the wheels, the bell crank supporting the rear axle may be swung forwardly to bring the front and rear wheels closer together and thus slacken both chains sufficiently to permit their removal from the sprocket gears.

We claim:

A drive chain adjuster for wheeled vehicles comprising in combination a vehicle frame, a drive shaft with housing mounted transversely on said vehicle frame, a sprocket gear mounted on said drive shaft, a dead axle spaced from said drive shaft, a wheel and sprocket on said dead axle, a drive chain engaging said sprockets, means for longitudinally shifting the dead axle with respect to the drive shaft and thereby adjusting the tension of said sprocket chain, said means comprising a rigid bell crank pivoted at its lower end to said vehicle frame for fore and aft swinging movement, said dead axle being journaled through and supported by said bell crank intermediate the ends of the latter, said bell crank comprising spaced parallel plates lying on each side of a longitudinal member of the vehicle frame and pivotally connected at their lower ends to a bracket mounted on such frame member, a tubular member having laterally projecting gudgeons, the upper ends of said parallel plates embracing said tubular member and being journaled on said gudgeons, a rigid link comprising a rod extending through said tubular member and threaded at its outer end to receive an internally threaded tubular adjuster sleeve one end of which abuts the end of said tubular member, the abutting ends of said sleeve and tubular member being formed with oppositely facing shoulders for engagement by a surrounding clamp to permit swivelling movement of the sleeve relative to the tubular member along said rod, thereby causing the bell crank to swing about its lower pivot, a bracket secured to the housing of the drive shaft and fixedly connected to said link to anchor one end of the link and to transmit forces from the bell crank through the link and said last mentioned bracket to the vehicle frame, the end of the link which is engaged by the threaded adjuster sleeve having upward inclination and extending above the vehicle frame for ready access by the operator of the vehicle.

References Cited in the file of this patent

UNITED STATES PATENTS

| | | |
|---|---|---|
| 750,867 | Lindsay | Feb. 2, 1904 |
| 951,096 | Ewing | Mar. 1, 1910 |
| 1,135,767 | Cheshire | Apr. 13, 1915 |
| 2,017,729 | Panzegrau | Oct. 15, 1935 |
| 2,187,658 | Lane et al. | Jan. 16, 1940 |
| 2,352,593 | Allin | July 4, 1944 |

FOREIGN PATENTS

| | | |
|---|---|---|
| 26,895 1896 | Great Britain | Feb. 13, 1897 |
| 408,353 | Great Britain | Apr. 12, 1934 |